(12) United States Patent
Yang et al.

(10) Patent No.: US 8,755,010 B2
(45) Date of Patent: Jun. 17, 2014

(54) DISPLAYS WITH MULTILAYER MASKS AND COLOR FILTERS

(75) Inventors: Young Cheol Yang, Sunnyvale, CA (US); Cheng Chen, San Jose, CA (US); Ming Xu, Sunnyvale, CA (US); Zhibing Ge, Sunnyvale, CA (US); Chia-Ching Chu, San Jose, CA (US); Mingxia Gu, San Jose, CA (US); Young-Bae Park, San Jose, CA (US); Weimin Liu, San Jose, CA (US); EnkhAmgalan Dorjgotov, San Francisco, CA (US); John Z. Zhong, Cupertino, CA (US); Lynn R. Youngs, Cupertino, CA (US)

(73) Assignee: Apple Inc., Cupertino, CA (US)

(*) Notice: Subject to any disclaimer, the term of this patent is extended or adjusted under 35 U.S.C. 154(b) by 141 days.

(21) Appl. No.: 13/299,289

(22) Filed: Nov. 17, 2011

(65) Prior Publication Data

US 2013/0128193 A1    May 23, 2013

(51) Int. Cl.
*G02F 1/1333* (2006.01)
*G02F 1/1335* (2006.01)

(52) U.S. Cl.
USPC .......................................... 349/110; 349/106

(58) Field of Classification Search
USPC .......................................... 349/106, 110, 153
See application file for complete search history.

(56) References Cited

U.S. PATENT DOCUMENTS

| | | | |
|---|---|---|---|
| 5,786,042 A * | 7/1998 | Inoue et al. | 428/1.3 |
| 5,827,409 A | 10/1998 | Iwata et al. | |
| 5,844,645 A * | 12/1998 | Kashimoto | 349/106 |
| 5,914,206 A * | 6/1999 | Takasaki et al. | 430/7 |
| 6,037,711 A | 3/2000 | Cathey et al. | |
| 6,157,426 A | 12/2000 | Gu | |
| 6,853,416 B2 * | 2/2005 | Hamamoto et al. | 349/106 |
| 7,196,468 B2 | 3/2007 | Fukuda | |
| 7,586,565 B2 * | 9/2009 | Kao | 349/110 |
| 2005/0147899 A1 | 7/2005 | Sun et al. | |
| 2007/0211194 A1 * | 9/2007 | Cho | 349/106 |
| 2010/0225858 A1 | 9/2010 | Dong et al. | |
| 2011/0249339 A1 | 10/2011 | Horie | |
| 2012/0147303 A1 | 6/2012 | Yamada et al. | |

FOREIGN PATENT DOCUMENTS

| | | |
|---|---|---|
| WO | 2007111841 | 10/2007 |
| WO | WO 2010/150615 | 12/2010 |

OTHER PUBLICATIONS

International Search Report dated Dec. 12, 2012, PCT/US2012/055433, 4 pages.

* cited by examiner

*Primary Examiner* — Thoi Duong
(74) *Attorney, Agent, or Firm* — Brownstein Hyatt Farber Schreck, LLP

(57) ABSTRACT

An electronic device may have a display such as a liquid crystal display. The display may have multiple layers of material such as a color filter layer and a thin-film transistor layer. An opaque masking layer may be formed on a display layer such as the color filter layer. In an inactive portion of the display, the opaque masking layer may form a rectangular ring that serves as a border region surrounding a rectangular active portion of the display. In the active portion of the display, the opaque masking layer may be patterned to from an opaque matrix that separates color filter elements in an array of color filter elements. The opaque masking layer and color filter elements may be formed from polymers such as photoresist. The opaque masking layer may include a black pigment such as carbon black. Color filter elements and opaque masking material may include multiple sublayers.

21 Claims, 13 Drawing Sheets

DISPLAYS WITH MULTILAYER MASKS AND COLOR FILTERS

BACKGROUND

This relates generally to electronic devices and, more particularly, to electronic devices with displays.

Electronic devices such as computers and cellular telephones may have displays. In a typical display such as a liquid crystal display, an array of display pixels is used to display images for a user. Each display pixel may contain an electrode that is used to apply an adjustable electric field to a portion of a liquid crystal layer. The magnitude of the electric field in each pixel controls how much light is allowed to pass through the display to the user.

To provide a display such as a liquid crystal display with the ability to display color images, an array of color filter elements may be aligned with the array of display pixels. A color filter array may contain color filter elements such as red, blue, and green color filter elements that are separated from each other by a patterned black masking layer. Portions of the black masking layer may also be used around the periphery of the color filter array. A typical black masking layer is formed from a resin that has been colored with a black pigment such as carbon black.

To enhance device aesthetics and to improve the visibility of information on a display, it may be desirable to reduce reflections from components in the display. Unwanted reflections may make black portions of the display such as portions of a black masking layer appear lighter than desired. Reflections from structures in the vicinity of the display pixels in a display may make it difficult for a viewer to see images on the display. With traditional display designs, it can be challenging to reduce reflections, because the structures in the display are prone to reflections. For example, although black masking layers formed from resins that incorporate carbon black are black in color, such layers may give rise to undesired reflections when used in an electronic device display.

It would therefore be desirable to be able to provide electronic devices with improved displays such as electronic devices with minimized display reflections.

SUMMARY

An electronic device may have a display such as a liquid crystal display. The display may have multiple layers of material such as a color filter layer and a thin-film transistor layer. A layer of liquid crystal material may be interposed between the color filter layer and the thin-film transistor layer.

An opaque masking layer may be formed on a display layer such as the color filter layer. The display may have a central active area such as a rectangular active area. Display pixels in the active area may present images to a user of the electronic device. The active area may be surrounded by an inactive area. For example, the active area may be surrounded by an inactive area that has the shape of a rectangular ring.

In the inactive portion of the display, the opaque masking layer may form a rectangular border that surrounds the active area. In the active area, the opaque masking layer may be patterned to form a black matrix. Color filter elements such as red, blue, and green color filter elements may be formed within openings in the black matrix.

The opaque masking layer and color filter elements may be formed from pigmented materials such as pigmented layers of photoresist. The opaque masking layer may include a black pigment such as carbon black. The color filter elements may include colored pigments such as red, blue, and green pigments.

Reflections may be reduced within the display by forming the opaque masking area and color filter elements from multiple sublayers. The sublayers may have different thicknesses and pigment concentrations. If desired, opaque masking layer material or color filter element material may be formed that has a smoothly varying pigment concentration.

Further features of the invention, its nature and various advantages will be more apparent from the accompanying drawings and the following detailed description of the preferred embodiments.

DETAILED DESCRIPTION

Figure 1:
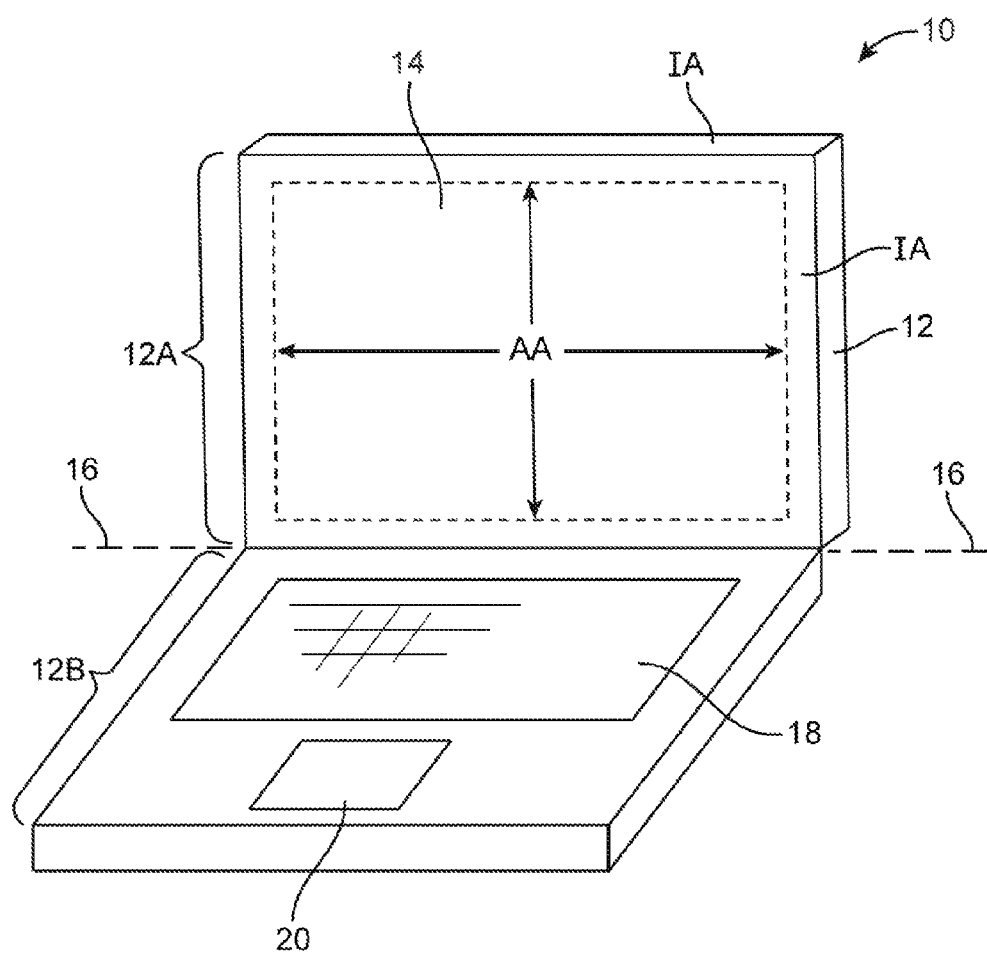
FIG. 1 is a diagram of an illustrative electronic device with a display such as a portable computer in accordance with an embodiment of the present invention.

An illustrative electronic device of the type that may be provided with a display is shown in FIG. 1. Electronic device 10 may be a computer such as a computer that is integrated into a display such as a computer monitor, a laptop computer, a tablet computer, a somewhat smaller portable device such as a wrist-watch device, pendant device, or other wearable or miniature device, a cellular telephone, a media player, a tablet computer, a gaming device, a navigation device, a computer monitor, a television, or other electronic equipment.

As shown in FIG. 1, device 10 may include a display such as display 14. Display 14 may be a touch screen that incorporates capacitive touch electrodes or other touch sensor components or may be a display that is not touch sensitive. Display 14 may include image pixels formed from liquid crystal display (LCD) components or other suitable display pixel structures. Arrangements in which display 18 is formed using liquid crystal display pixels are sometimes described herein as an example. This is, however, merely illustrative. Any suitable type of display technology may be used in forming display 14 if desired.

Device 10 may have a housing such as housing 12. Housing 12, which may sometimes be referred to as a case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.).

As shown in FIG. 1, housing 12 may have multiple parts. For example, housing 12 may have upper portion 12A and lower portion 12B. Upper portion 12A may be coupled to lower portion 12B using a hinge that allows portion 12A to rotate about rotational axis 16 relative to portion 12B. A keyboard such as keyboard 18 and a touch pad such as touch pad 20 may be mounted in housing portion 12B.

Display 14 may have an active area such as active area AA and an inactive area such as area IA. Active area AA may be, for example, a rectangular region in the center of display 14 in which display pixels are actively used to display images for a user of device 10. Inactive area IA may be devoid of active display pixels. In the example of FIG. 1, inactive area IA has the shape of a rectangular ring, surrounding the periphery of active area AA of display 14. Circuitry and other components may sometimes be formed in inactive area IA. To hide the circuitry and other components from view by a user of device 10, inactive area IA may sometimes be provided with an opaque mask. The opaque mask can be formed from an opaque material such as a black material or may be formed from opaque masking materials of other colors. Configurations in which the opaque masking material in display 14 has a black appearance are sometimes described herein as an example. This is, however, merely illustrative. Opaque masking layers in device 10 may have any suitable colors.

Figure 2:
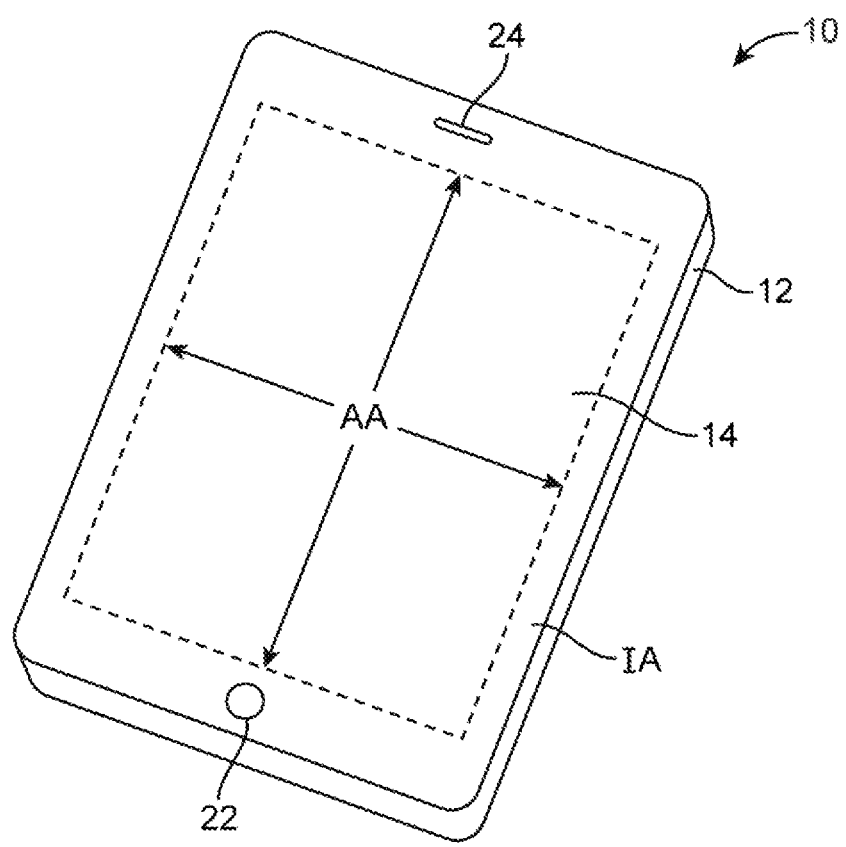
FIG. 2 is a diagram of an illustrative electronic device with a display such as a cellular telephone or other handheld device in accordance with an embodiment of the present invention.

In the example of FIG. 2, device 10 has been implemented using a housing that is sufficiently small to fit within a user's hand (i.e., device 10 of FIG. 2 may be a handheld electronic device such as a cellular telephone). As show in FIG. 2, device 10 may include a display such as display 14 mounted on the front of housing 12. Display 14 may be substantially filled with active display pixels or may have an inactive portion such as inactive portion IA that surrounds an active portion such as active portion AA. Display 14 may have openings (e.g., openings in inactive region IA or active region AA of display 14) such as an opening to accommodate button 22 and an opening to accommodate speaker port 24.

Figure 3:
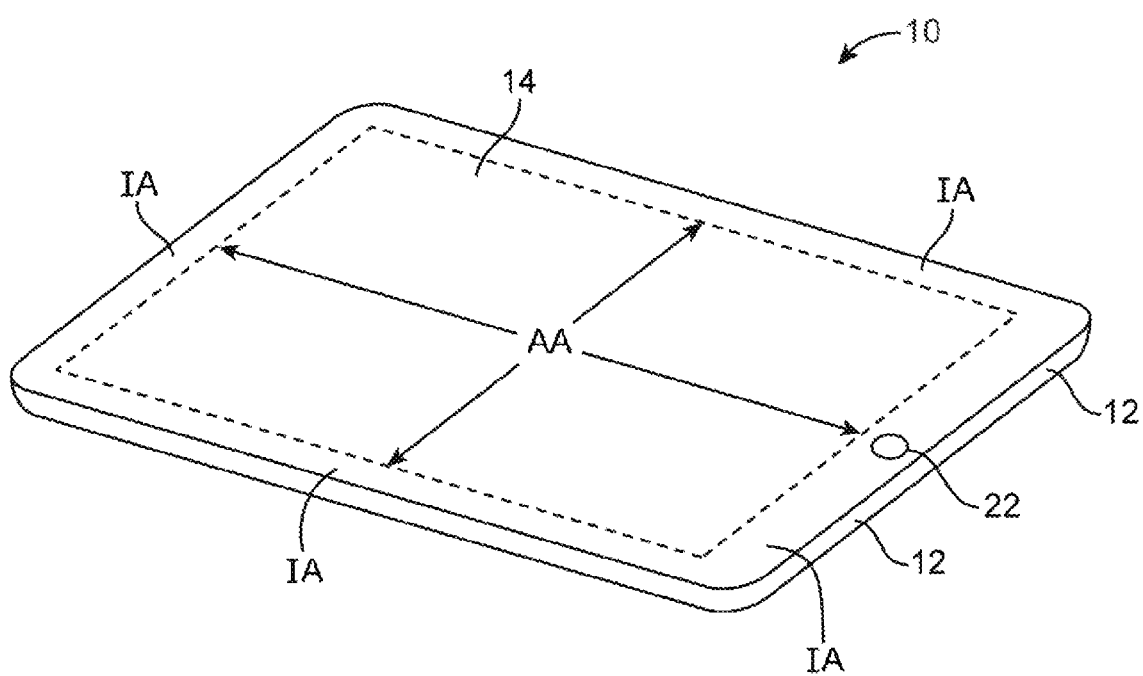
FIG. 3 is a diagram of an illustrative electronic device with a display such as a tablet computer in accordance with an embodiment of the present invention.

FIG. 3 is a perspective view of electronic device 10 in a configuration in which electronic device 10 has been implemented in the form of a tablet computer. As shown in FIG. 3, display 14 may be mounted on the upper (front) surface of housing 12. An opening may be formed in display 14 to accommodate button 22 (e.g., in inactive region IA surrounding active region AA).

Figure 4:
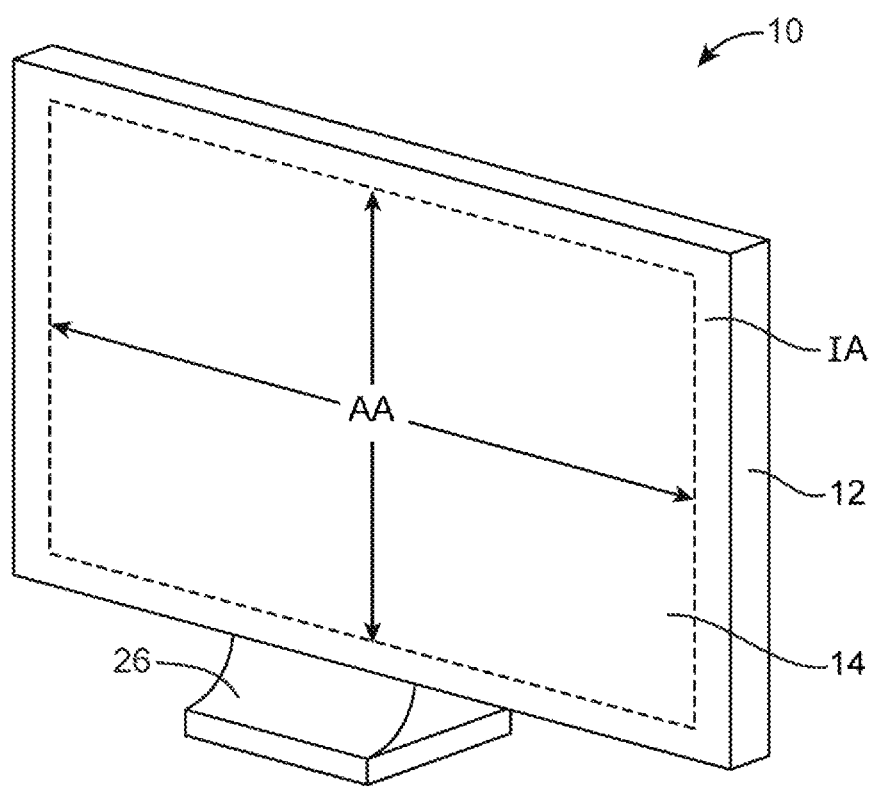
FIG. 4 is a diagram of an illustrative electronic device with a display such as a computer monitor with a built-in computer in accordance with an embodiment of the present invention.

FIG. 4 is a perspective view of electronic device 10 in a configuration in which electronic device 10 has been implemented in the form of a computer integrated into a computer monitor. As shown in FIG. 4, display 14 may be mounted on the front surface of housing 12. Stand 26 may be used to support housing 12. Display 14 may include an inactive region such as inactive region IA that surrounds active region AA.

If desired, display 14 may be configured so as to minimize or eliminate the size of inactive region IA along one or more edges of active region AA. Configurations in which inactive region IA extends along all four edges of a rectangular active region AA are described herein as an example.

Figure 5:
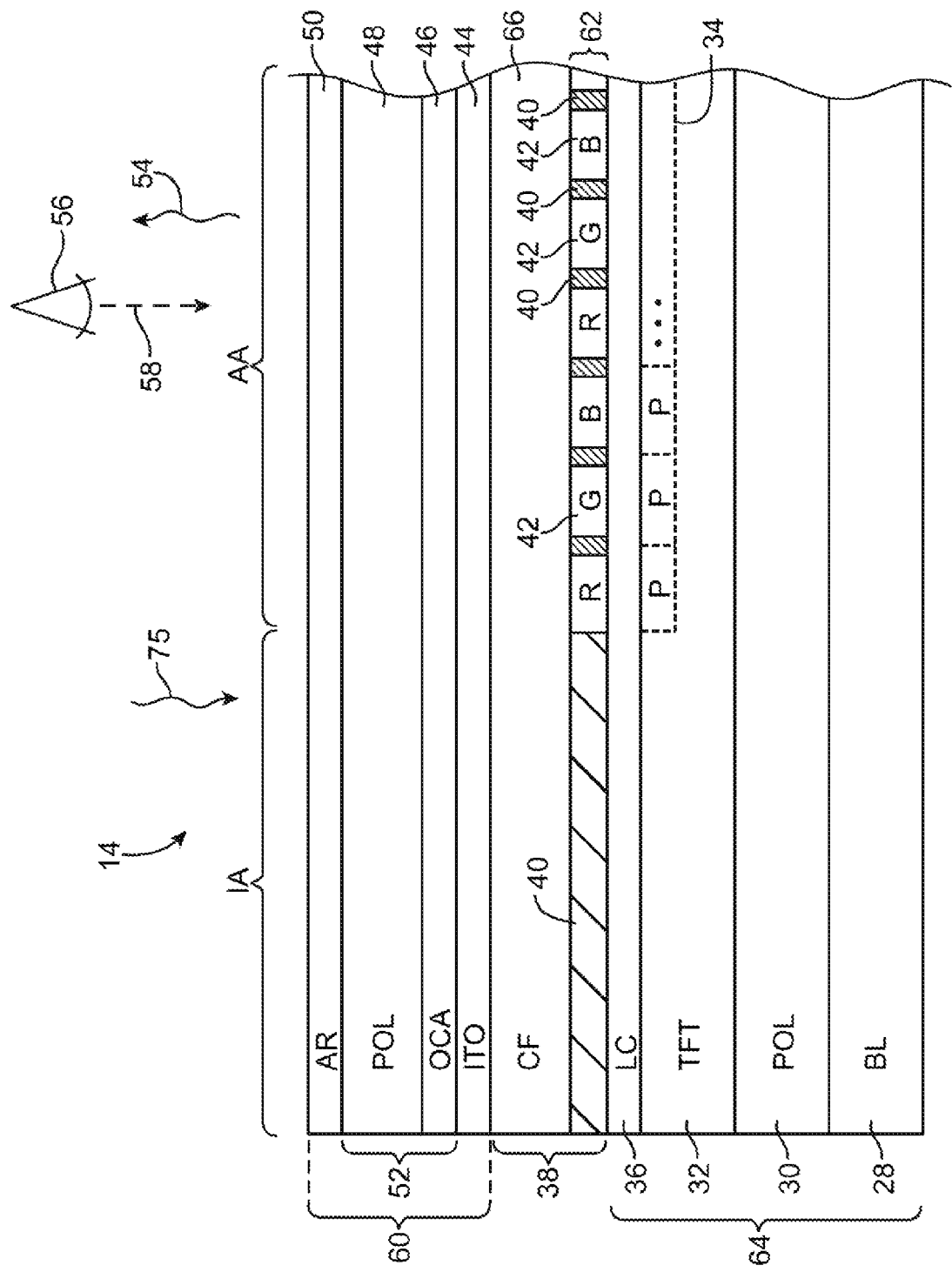
FIG. 5 is a cross-sectional side view of an illustrative display in accordance with an embodiment of the present invention.

Display 14 may be, for example, a liquid crystal display such as display 14 of FIG. 5. Display 14 may include an array of pixels. Each pixel may be used to control the light intensity associated with a portion of the display in active area AA.

Display 14 may have a layer of liquid crystal material such as liquid crystal material 36 that is sandwiched between a pair of polarizers such as upper polarizer 52 and lower polarizer 30. An array of electrodes may be controlled by the thin-film transistor circuitry in a thin-film transistor layer in display 14. As shown in FIG. 5, for example, display 14 may have an array of electrodes and associated thin-film transistor circuits such as thin-film transistor circuitry 34 on thin-transistor substrate layer 32 (e.g., a glass substrate). Thin-film transistor circuitry 34 may include thin-film transistor circuitry such as amorphous silicon transistor circuitry or polysilicon transistor circuitry. Thin film transistor circuitry 34 may also include interconnect lines to connect electrodes formed from conductive materials such as indium tin oxide and metal to thin-film structures such as thin-film transistors.

The electrodes in thin-film transistor circuitry 34 may be used to produce electric fields that control the orientation of liquid crystals in liquid crystal layer 36. Backlight unit 28 may be used to produce backlight 54 for display 14. Backlight 54 may pass through display 14 in vertical direction Z. This provides illumination for display 14 so that a user such as viewer 56 who is observing display 14 in direction 58 may clearly observe images that are produced by the display pixels in active area AA. By controlling the orientation of the liquid crystals in layer 36, the polarization of backlight 54 may be controlled. In combination with the presence of polarizer layers 30 and 52, the ability to control the polarization of the light passing through individual pixels of liquid crystal material 36 provides display 14 with the ability to display images for viewer 56.

Backlight unit 28 may include a light source such as a light-emitting diode array for producing backlight 54. Polarizers such as polarizer 30 and polarizer 52 may be formed from thin polymer films. For example, polarizer 52 may be formed from polymer film 48 and an associated adhesive layer such as optically clear adhesive layer 46.

If desired, display 14 may be provided with layers for reducing fingerprints (e.g., a smudge-resistant coating in a touch-sensitive display), anti-scratch coatings, an antireflection coating such as antireflection coating 50 of FIG. 5, a layer for reducing the impact of static electricity such as indium tin oxide electrostatic discharge protection layer 44 of FIG. 5, or other layers of material. The display layers that are used in the illustrative configuration of FIG. 5 are merely illustrative.

Display 14 may include a display layer such as color filter layer 38. Color filter layer 38 may include a color filter layer substrate such as substrate 66. Substrate 66 and the substrate for thin-film transistor layer 32 may be formed from clear layers of material such as glass or plastic.

Color filter layer 38 may include an array of color filter elements 42 formed on substrate 66. Color filter elements 42 may include, for example, red elements R, green elements G, and blue elements B. The array of color filter elements in color filter layer 38 may be used to provide display 14 with the ability to display color images. Each of display pixels P in thin-film transistor layer 34 may be provided with a respective overlapping color filter element 42.

Adjacent color filter elements 42 may be separated by interposed portions of opaque masking material 40. Opaque masking material may be formed from a dark substance such as a polymer that contains a black pigment and is therefore sometimes referred to as a black mask, black masking layer, black pigmented layer, or black masking material. Illustrative polymeric materials for forming black masking layer 40 include acrylic-based and polyimide-based photoresists. An illustrative black pigment that may be used for black masking layer 40 is amorphous carbon (e.g., carbon black).

In active region AA, black mask 40 may be formed from a grid of relatively thin lines (sometimes referred to as a black matrix). The black matrix may have a pattern of openings such as an array of rectangular holes for receiving color filter elements. In inactive region IA, black masking material may be used in forming a peripheral black mask that serves as a black border for display 14. The black mask in inactive area IA may have a rectangular ring shape that surrounds a central rectangular active area AA (as an example).

Light such as ambient light 75 may reflect from the interfaces of the layers in display 14, leading to the potential for undesired reflections. Light reflections at the surface of display 14 may be minimized using an antireflection layer such as layer 50. To minimize internal light reflections, structures such black masking layer 40 and/or color filter elements 40 may be formed using multiple layers of material.

As shown in FIG. 5, color filter elements 42 and black masking layer 40 may form layer 62 on the lower surface of substrate 66. The layers of material that lie above layer 66 (layers 60 of FIG. 5) and the layers of material that lie below layer 62 (layers 64 of FIG. 5) may be modeled as infinitely thick material layers having an index of refraction of 1.5 (e.g., an index of refraction substantially equal to the index of refraction for glass).

Figure 6:
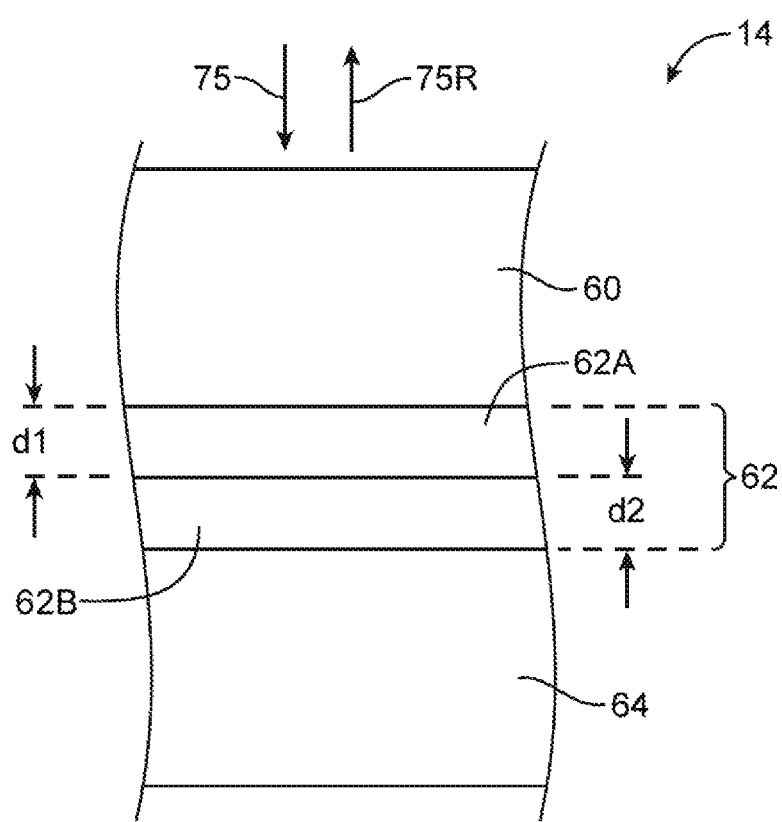
FIG. 6 is cross-sectional side view of a portion of a display including multiple layers of material configured to minimize reflections in accordance with an embodiment of the present invention.

This optical model of the layers of material in display 14 is shown in FIG. 6. As shown in FIG. 6, ambient light 75 may be reflected from display 14, leading to the potential for undesired reflected light 75R. Some of reflected light 75R may be produced by the materials of layer 60. For example, the air interface at the upper surface of layer 60 can give rise to reflections due to the index mismatch between the air and the glass-like materials of layer 60.

The materials of layer 62 may also contribute to reflections. The materials of layer 62 include black masking material 40 and color filter elements 42. The black masking material in layer 62 and the color filter material in layer 62 may each be characterized by an index of refraction having a real component and an imaginary component. In the black masking regions of layer 62, the imaginary component of the index of refraction is responsible for producing desirable attenuation in the intensity of white light transmitted through layer 62. In the color filter elements, the imaginary index of refraction is associated with attenuating out-of-band light (e.g., the attenuation of red and blue light in a green color filter element).

It can be difficult or impossible to index match a single homogenous layer of material 62 to adjacent layers in display 14 due to the presence of non-zero imaginary index-of-refraction components in layer 62. By using two or more sublayers in layer 62, however, a combination of sublayers may be provided in layer 62 that has the overall effect of minimizing reflections. In the example of FIG. 6, layer 62 has been provided with two sublayers (upper layer 62A of thickness d1 and lower layer 62B of thickness d2). In general, portions of layer 62 may have any suitable number of sublayers (e.g., one or more, two or more, three or more, etc.). The thicknesses of each of the sublayers and the index of refraction of each sublayer may be configured so that reflections due to the interface produced by layer 62 can be reduced.

Figure 7:
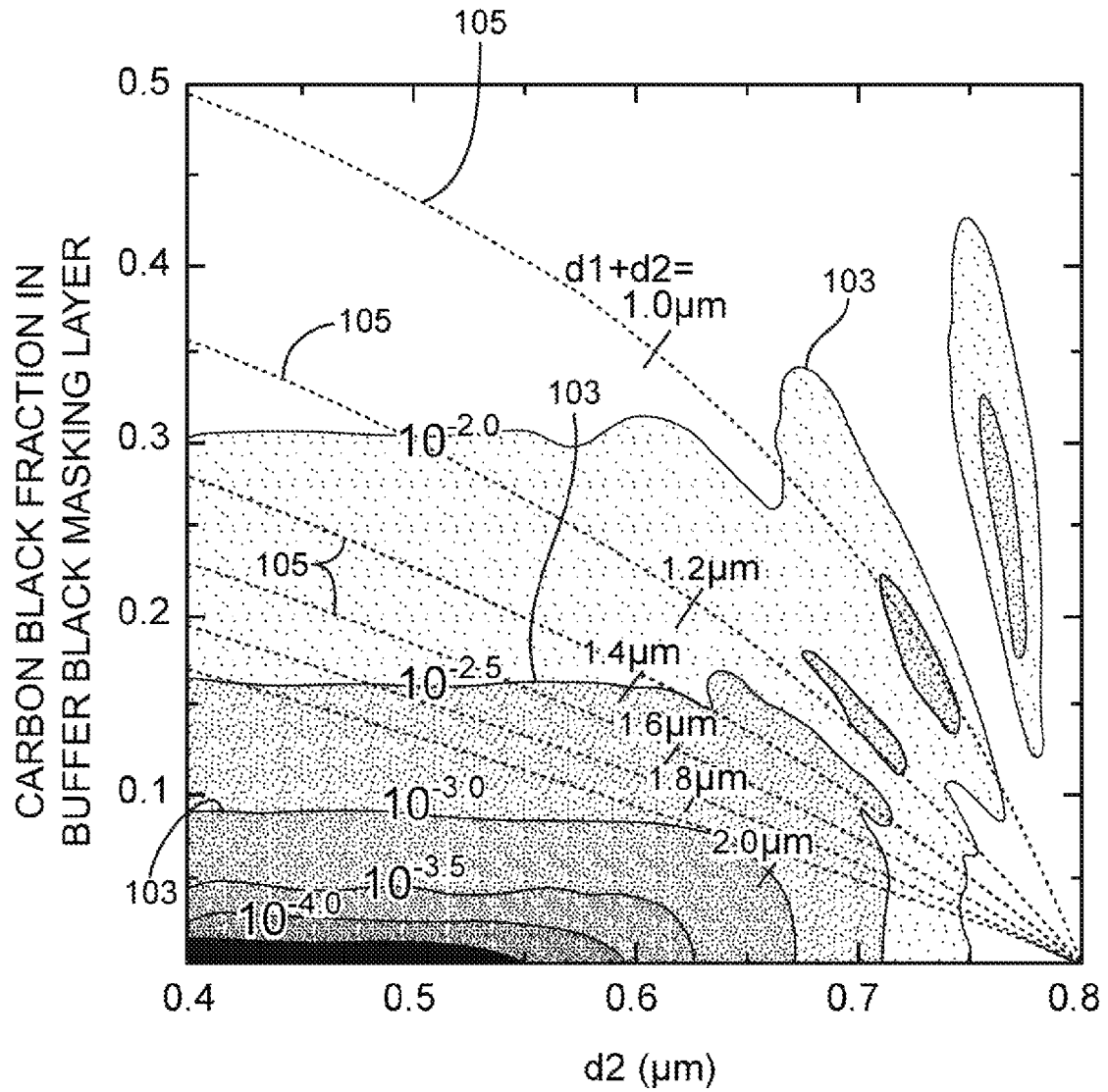
FIG. 7 is a graph illustrating how reflectance may be influenced by factors such as layer thickness and composition in a multi-layer display structure of the type shown in FIG. 6 in accordance with an embodiment of the present invention.

FIG. 7 is a graph showing how the multilayer thin-film interference equations for the stack-up of FIG. 6 may be solved to produce desirable reductions in reflection. In the scenario represented by the graph of FIG. 7, it has been assumed that black masking layer 40 is to be implemented using a two-layer configuration having upper and lower sublayers. The lower sublayer has been formed from a material that has a large amount of carbon black to maximize its opacity. In the FIG. 7 example, the lower sublayer of black masking material 40 has been provided with an 80% carbon black concentration (i.e., the fraction of carbon black in the lower layer has been set to 0.8). This represents an illustrative maximum achievable carbon black concentration. Other concentrations may be used if desired (e.g., the lower sublayer may have a carbon black concentration of at least 60%, at least 70%, at least 80%, or other suitable concentration). Because the carbon black concentration in the lower black mask layer of this example is relatively large, the lower black mask layer may sometimes be referred to as the main black mask layer in black mask layer 40. The upper layer, whose carbon black concentration and thickness may be chosen to minimize reflections while satisfying other constraints such as manufacturing constraints, may sometimes be referred to as the buffer layer in black mask layer 40.

In the graph of FIG. 7, the thickness of the main layer of black masking material (d2) has been plotted on the horizontal axis. The concentration of carbon black that is to be used in the upper layer is plotted on the vertical axis. It was assumed that black masking layer 40 should be sufficiently opaque to reduce the transmittance through layer 40 to a value of $10^{-5.3}$. Lines 103 correspond to different amounts of black mask reflectivity (e.g., $10^{-2}$, $10^{-2.5}$, etc.). Lines 105 correspond to different total thickness (d1+d2) for black masking layer 40. It was assumed that the index of refraction for the buffer layer could be modeled as a homogenous mixture in accordance with equation 1.

$$n_{bm}=(n_1^2 x+n_2^2(1-x))^{1/2} \quad (1)$$

In equation 1, $n_1$ represents the index of refraction of carbon black (which has a real index component of 1.95 and an imaginary index component of 0.79), $n_2$ represents the index of refraction of the clear photoresist resin into which the carbon black is incorporated to form the black masking material, x is the fraction of carbon black, and $n_{bm}$ is the resulting black masking material index of refraction.

Point 101 represents an illustrative satisfactory configuration for black mask layer 40. When the attributes corresponding to point 101 on the graph of FIG. 7 are used for layer 40, layer 40 will be characterized by minimized reflectivity while having a total thickness (d1+d2) that is not too thick (thicknesses above 2 microns may produce manufacturing difficulties). Layer 40 will also have a configuration that is not too sensitive to variations in thicknesses d1 and d2 (as is the case for points near the right-hand side of the graph) and will exhibit a satisfactory balance between the d1 and d2 thickness values. As shown in FIG. 7, point 101 corresponds to a black mask buffer layer having a carbon black concentration of about 0.15, a d2 value of 0.6 microns, and a total thickness (d1+d2) of 1.6 microns. If desired, empirical measurements may be used to refine the selection of d1, d2, and the carbon black concentrations for the main and buffer black mask layers.

Moreover, this modeling (and, if desired, empirical refinement) approach may be applied to other combinations of materials in layer 62. For example, satisfactory thicknesses and pigment concentrations may be identified for structures having three or more layers of material, for structures including multiple layers of color filter material, and for structures including combinations of one or more layers of black masking material and one or more layers of color filter material. Color filter material for elements 42 may be formed by combining red, green, and blue pigments of various concentrations with polymeric material such as acrylic-based or polyimide-based photoresist. During modeling and/or empirical measurements, satisfactory thicknesses for the color filter materials and black mask materials and satisfactory pigment concentrations can be identified to minimize contributions to reflected light 75R from opaque mask regions 40 and color filter elements 42 of layer 62.

An illustrative process for forming a double-layer black mask is shown in FIGS. 8, 9, 10, 11, and 12.

Figure 8:
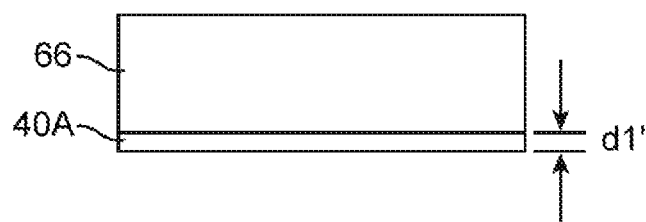
FIGS. 8, 9, 10, 11, and 12 are cross-sectional side views of black masking layer structures being fabricated to reduce reflections in accordance with an embodiment of the present invention.

As shown in FIG. 8, a layer of material for black mask layer 40A may be deposited on the underside of substrate 66 (e.g., by using a slot coating technique in which a squeegee applies a layer of material of a desired thickness or other suitable techniques). The initial thickness of layer 40A may be d1'.

Figure 9:
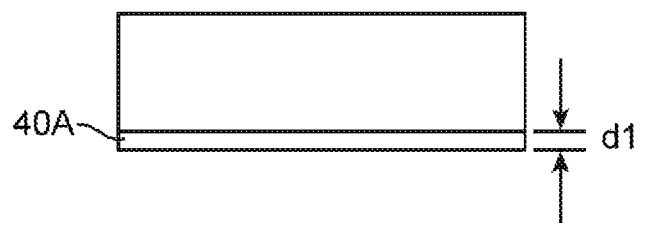

A soft bake operation may be used to drive out solvents from layer 40A, resulting in a thinner thickness d1 for layer 40A, as shown in FIG. 9.

Figure 10:
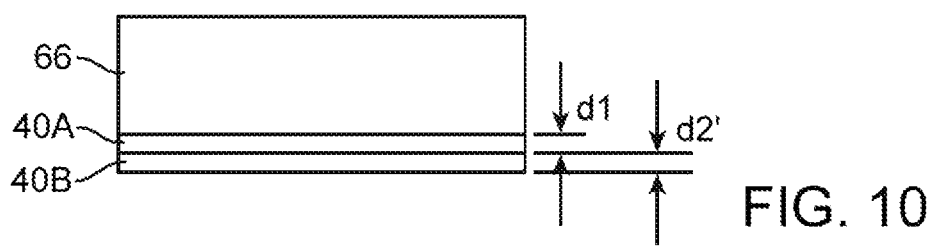
Figure 11:
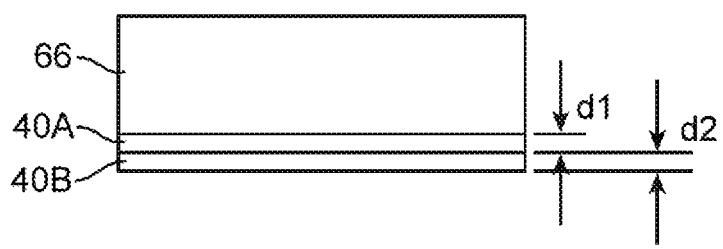

After the soft bake operation, an additional layer of black mask material (coating 40B) may be formed on layer 40A (e.g., by slot coating). As shown in FIG. 10, layer 40B may have a thickness of d2'. Following application of an elevated "soft bake" temperature, solvent may be driven out of layer 40B so that layer 40B has a thinner thickness of d2, as shown in FIG. 11.

Figure 12:
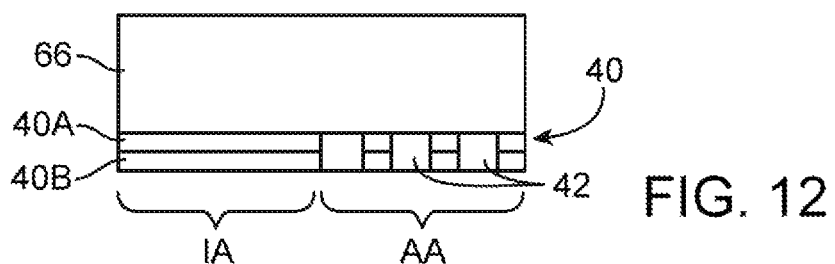

Following a hard bake to cure the photoresist material from which black mask layers 40A and 40B are formed and following photolithographic patterning (e.g., resist exposure and development), black mask layer 40 may have the appearance shown in FIG. 12. In inactive region IA, layers 40A and 40B may form a black border mask for display 14. In active region AA, holes in black mask layer 40 (e.g., an array of rectangular holes in a black matrix portion of layer 40) may be filled with color filter elements 42 to serve as a color filter array for display 14.

Figure 13:
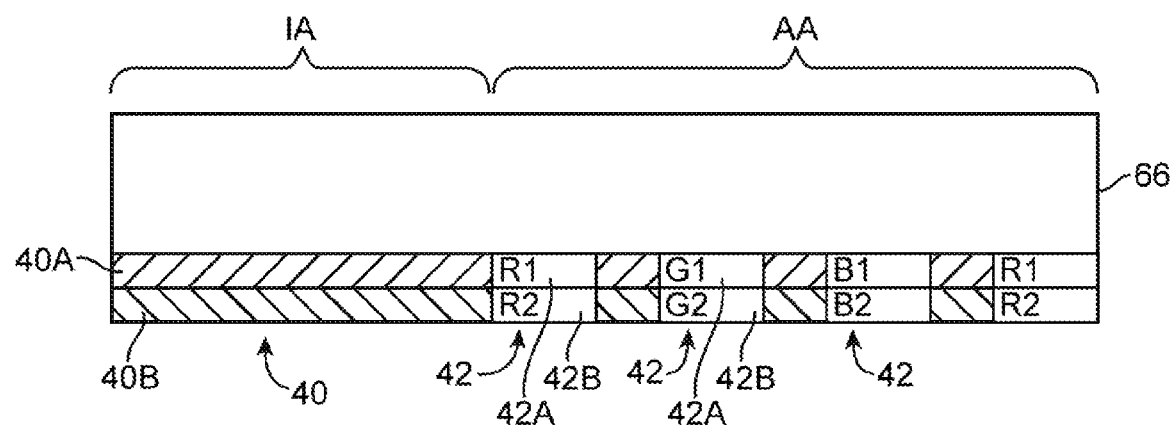
FIG. 13 is a cross-sectional side view of black masking layer and color filter element structures that have been fabricated to reduce reflections in accordance with an embodiment of the present invention.

As shown in FIG. 13, the amount of incoming light that is reflected from color filter elements 42 may be minimized by using the same approach used for the black mask region (as described in connection with FIG. 7) for forming the color filter elements. In the FIG. 13 example, each color filter element 42 has been formed from a respective first color filter element layer 42A and a respective second color filter element layer 42B. If desired, only some colors of color filter element may be provided with multiple layers while one or more other colors of color filter elements are formed from solid color filter material (i.e., structures that are formed exclusively from a single color pigmented material). Color filter elements 42 may also formed from three or more layers of color filter material if desired. In general, each of the sublayers in a color filter element may have a potentially different thickness and color pigment concentration. The thicknesses and pigment concentrations of the layers may be configured to reduce reflections while satisfying design constraints such as layer thickness limits, desired amounts of color filtering, etc.

FIGS. 14, 15, 16, and 17 illustrate how color filter material (e.g., photoresist that incorporates colored pigment such as red, blue, or green pigment instead of exclusively black pigment) may be used in forming black mask structures. In the example of FIGS. 14, 15, 16, and 17, blue color filter material has been used to help form black mask regions 40. Color filter materials of different colors (e.g., red, blue, etc.) may be used if desired.

Figure 14:
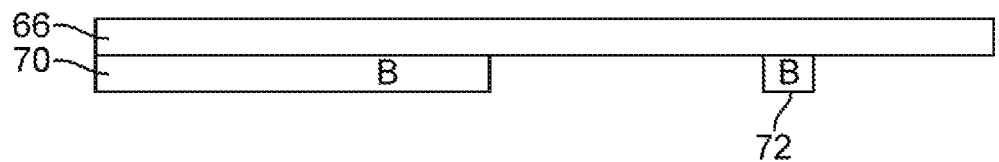
FIGS. 14, 15, 16, and 17 are cross-sectional side views of illustrative display structures showing how a patterned black masking layer may be implemented using a layer of color filter material and a layer of opaque material such as black mask material in accordance with an embodiment of the present invention.

Initially, a layer of blue color filter material may be deposited and patterned on substrate 66, as shown in FIG. 14. The blue color filter material may portions such as portions 70 and 72.

Figure 15:
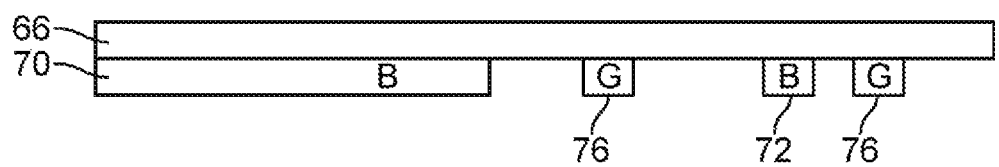

Following the formation of the blue color filter layer, a layer of green color filter element material such as green pigmented material 76 may be deposited and patterned, as shown in FIG. 15.

Figure 16:
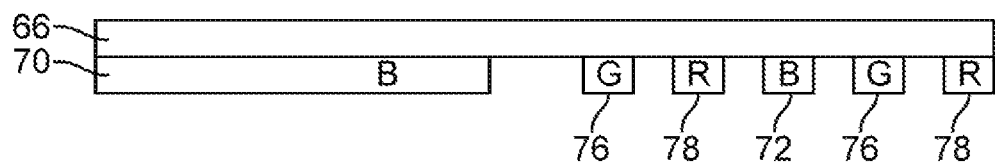

FIG. 16 illustrates how a layer of red color filter element material such as red pigmented material 78 may then be deposited and patterned to form red color filter elements.

Figure 17:
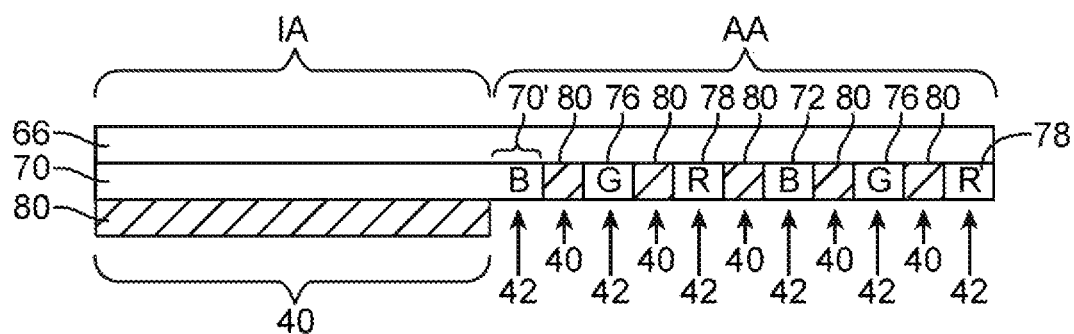

As shown in FIG. 17, black pigmented material 80 (e.g., photoresist containing carbon black) may be deposited and patterned on top of the structures of FIG. 16. In active region AA, some of black pigmented material 80 will separate adjacent color filter elements and will serve as a grid-shaped black mask layer 40 (black matrix) for display 14. In inactive region IA, the portion of blue filter material 70 that is covered by black pigmented material 80 will form a portion of black masking layer 40 that can serve as an opaque border for display 14. Because multiple layers of material (i.e., layers 70 and 80) are used, the pigment concentrations and thicknesses of layers 70 and 80 may be selected to minimize black mask reflections in the inactive border region, as described in connection with FIG. 7. Portion 70' of blue layer 80 may remain uncovered by black pigmented material 80 (in the FIG. 17 example) and may therefore serve as a blue color filter element in the color filter array of active region AA.

FIGS. 18, 19, 20, 21, and 22 illustrate how the black mask structures in active area AA may be formed using a layer of color filter material (i.e., color pigmented material) in addition to black pigmented material.

Figure 18:
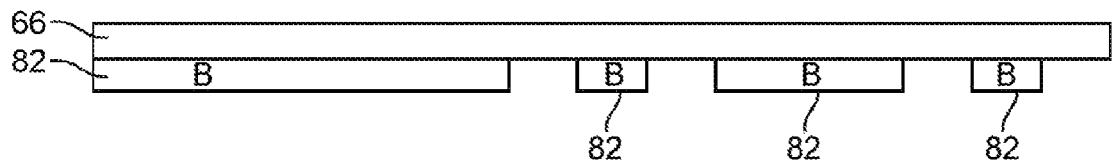
FIGS. 18, 19, 20, 21, and 22 are cross-sectional side views of illustrative display structures showing how patterned black masking layer and color filter element structures may be implemented using multiple layers of material including a layer of color filter material in accordance with an embodiment of the present invention.

As shown in FIG. 18, a patterned layer of blue color filter material 82 (or color filter material of other colors) may initially be formed on substrate layer 66.

Figure 19:
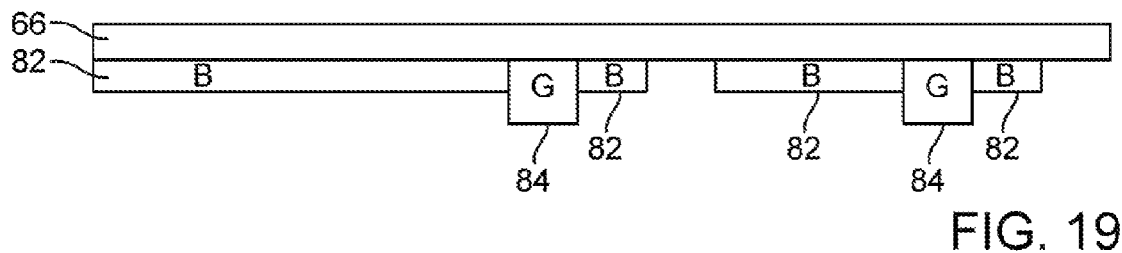

FIG. 19 shows how a layer of green color filter material 84 may be deposited and patterned on the structures of FIG. 18.

Figure 20:
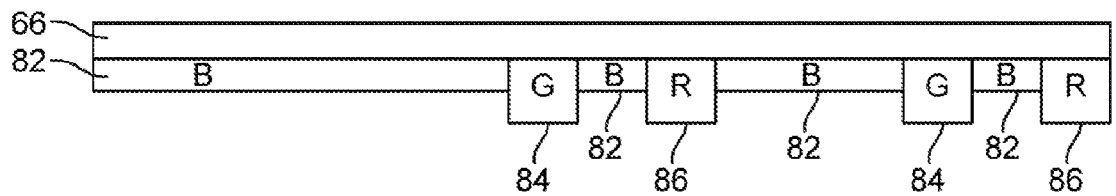

FIG. 20 shows how a layer of red color filter material 86 may be deposited and patterned on the structures of FIG. 19.

Figure 21:
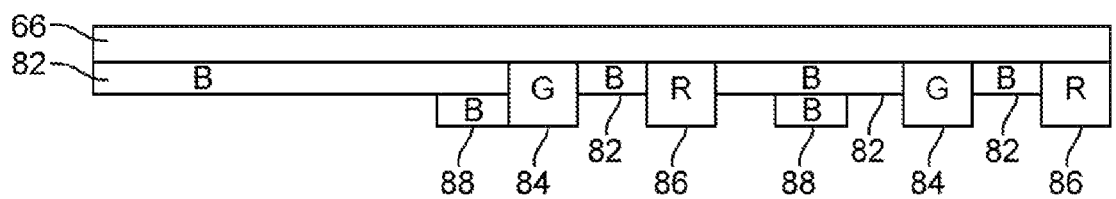
Figure 22:
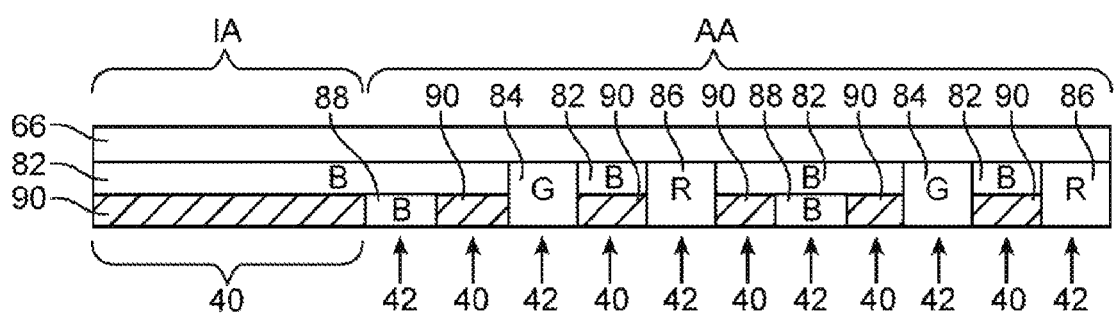

Additional blue color filter material 88 may then be deposited and pattered, producing the structures of FIG. 21.

The structures of FIG. 21 may be covered with a patterned layer of black pigmented material 90 (e.g., photoresist containing carbon black). In inactive region IA, black pigmented material 90 overlaps blue color filter material 82 and produces a region of black masking layer 40 (i.e., a black border structure) with a reduced reflectivity. In active area AA, black pigmented material 90 may likewise overlap blue color filter material 82 and may produce a grid-shape pattern of black masking material (i.e., a black matrix) with a reduced reflectivity. Red color filter elements 42 in active area AA may be formed from a single layer of red color filter material (material 86). Green color filter elements 42 in active area AA may be formed from a single layer of green color filter material (material 84). Blue color filter elements 42 in active area AA may be formed by initial blue layer 82 and additional blue layer 88.

Figure 23:
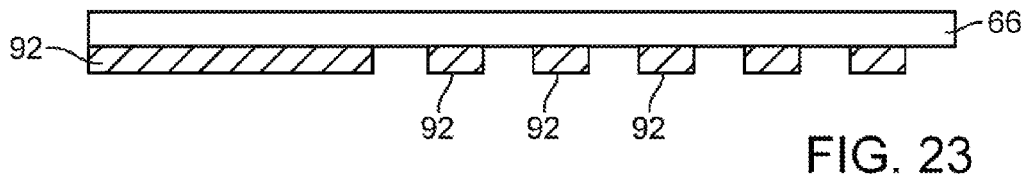
FIGS. 23, 24, and 25 are cross-sectional side views of black masking layer and color filter layer structures showing how multiple layers of patterned black masking material may be used to reduce color washout in a configuration in which reflections are being reduced by minimizing black masking layer pigment concentrations in accordance with an embodiment of the present invention.
Figure 24:
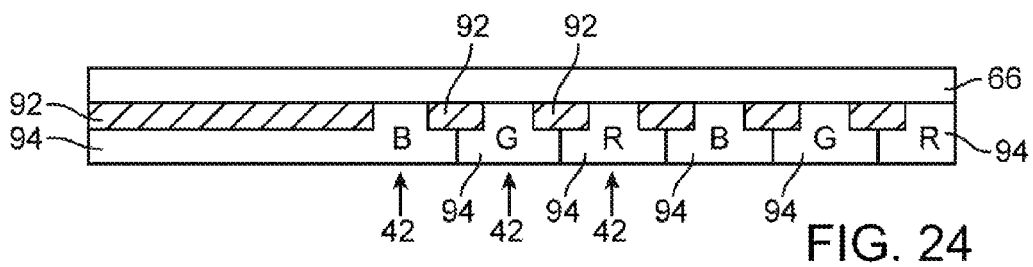
Figure 25:
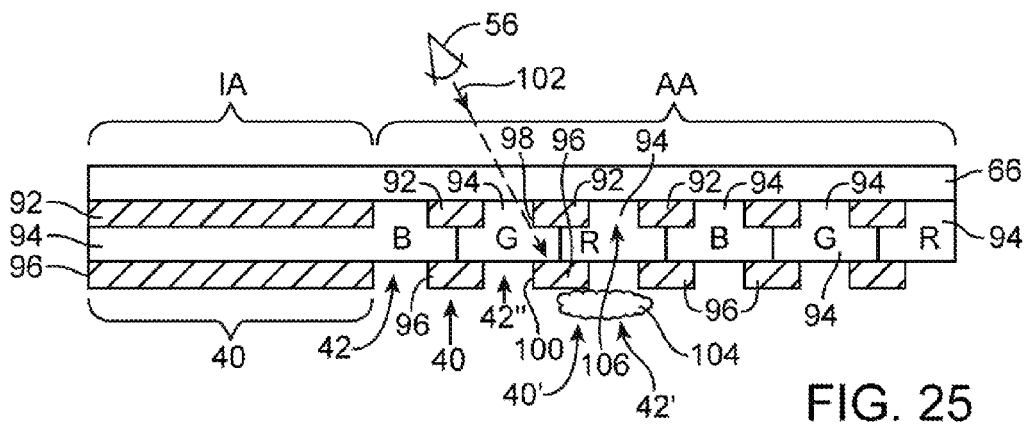

FIGS. 23, 24, and 25 show how an illustrative color filter layer may be produced that has multiple layers of black pigmented material with interposed color filter material. This type of arrangement may have a relatively thick overall thickness (e.g., 1-5 microns, 3-4 microns, or other suitable thickness), allowing reflectivity to be minimized by using materials that are characterized by relatively low values for their imaginary index of refraction component.

Initially, black pigmented material 92 may be deposited and patterned on substrate 66, as shown in FIG. 23.

The structures of FIG. 23 may then be covered with an array of color filter elements 42 formed from red, blue, and green pigmented color filter material 94.

FIG. 25 shows how an additional layer of black pigmented material 96 may be deposited and patterned on of the structures of FIG. 23. In the color filter layer of FIG. 25, black mask 40 in inactive region IA may be formed from initial black pigmented layer 92 and additional black pigmented layer 96 and an interposed portion of blue color filter element layer 94. Uncovered portions of blue pigmented layer 94 in active region AA may form blue color filter elements 42. Red and green color filter elements and blue color filter elements 42 may be separated by a grid-shaped pattern of black masking lines 40 (black matrix lines) each of which may be formed by a line of black pigmented material 92, an overlapping line of black pigmented material 96, and an interposed portion of color filter layer 94.

There is a potential for color washout in display 14 to arise during off-angle viewing, particularly in situations in which the thickness of layers 92, 96, and 94 is relatively large. Consider, for example, a scenario in which display 14 is displaying a red pixel for viewer 56.

In this situation, liquid crystal material 104 under a red color filter element will be "on" and transmitting light. If viewer 56 observes display 14 along off-axis direction 102, viewer 56 may erroneously observe pixel 104 through a portion of an adjacent green color filter element. Light propagating along axis 102 (light that has the potential to appear erroneously green rather than red in this example) may miss edge 98 of initial black pigmented line 92. Due to the presence of edge portion 100 of additional black pigmented layer 96, however, this light will be blocked by additional black pigmented layer 96. The use of a double-black-pigmented-layer structure to form black mask 40 in active area AA may therefore reduce color washout in display 14 to acceptable levels, even when thick layers of material are used to help reduce reflections.

Figure 26:
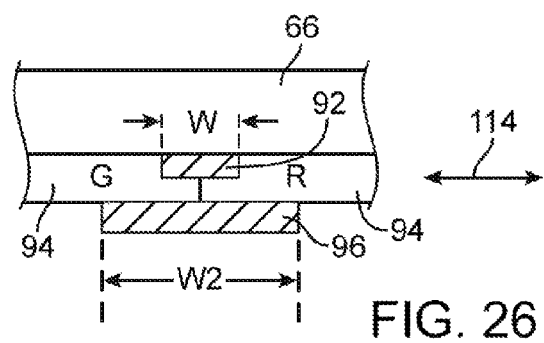
FIG. 26 is a cross-sectional side view of a portion of a multi-layer display structure of the type shown in FIG. 25 in which the width of the lines in the lower black masking layer in a black matrix has been enlarged to enhance alignment tolerance in accordance with an embodiment of the present invention.

To improve alignment tolerances for the portions of grid-shaped black masking layer 40 in active area AA, it may be desirable to form the lines in the lower (more internal) layer of black pigmented material with a larger width than the lines in the upper (more external) layer of black pigmented. This type of arrangement is shown in FIG. 26. As shown in FIG. 26, the portion of black pigmented layer 92 between adjacent green and red color filter elements in layer 94, respectively, may be characterized by a width W1 that is smaller than the width W2 of the corresponding portion of black pigmented layer 96. By forming black mask patterns in active area AA that include lines 92 that are narrower than lines 96, the tolerance of display 14 to misalignment between lines 92 and 96 may be enhanced.

If desired, one or more layers in layer 62 (e.g., one or more black masking layers and/or one or more layers of color filter material) may be provided with a pigment concentration that varies continuously. Use of a pigment concentration that varies smoothly within a layer as a function of distance through the layer may help to reduce light reflections in the black mask structures and/or color filter structures in display 14 without requiring the use of multiple distinct layers of material.

Figure 27:
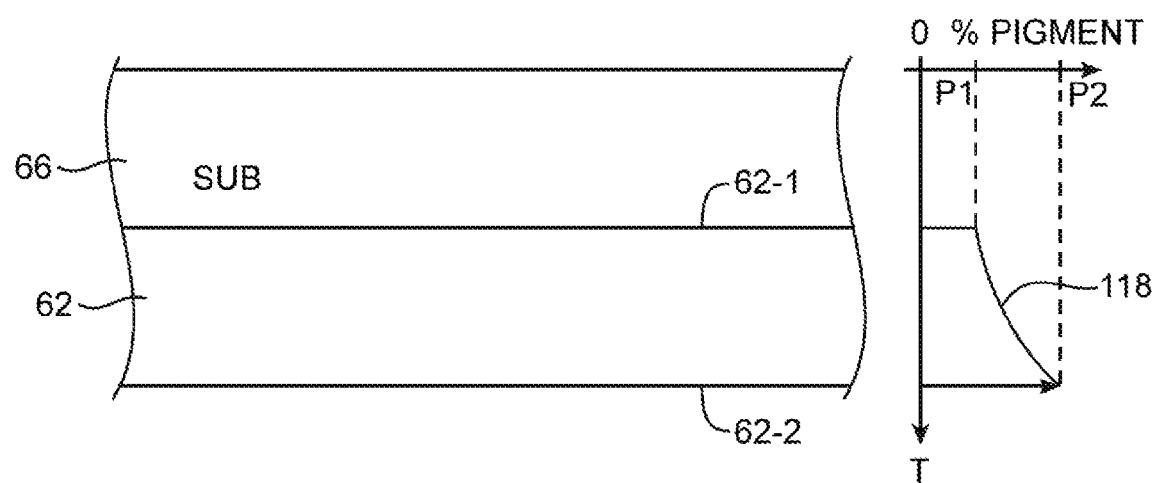
FIG. 27 is a cross-sectional side view of illustrative display structures for a display showing how pigment may be distributed in a graded fashion throughout the thickness of a layer to reduce reflections in accordance with an embodiment of the present invention.

FIG. 27 is a cross sectional side view of a portion of display 14 showing how the concentration of pigment (% pigment) in layer 62 may vary as a function of dimension T (i.e., as a function of vertical distance through layer 62). Layer 62 may have opposing first and second surfaces. Surface 62-1 may be located adjacent to substrate 66. Surface 62-2 may be, for example, the innermost surface of layer 62 and may be located adjacent to a display layer, air, or other structures in display 14. At surface 62-1, layer 62 may have a pigment concentration of P1. As shown by curve 118, the pigment concentration in layer 62 may increase smoothly as a function of increasing distance T (i.e., distance away from surface 62-1) and may have a pigment concentration value of P2 at surface 62-2. The pigment in layer 62 may be a black pigment such as carbon black (e.g., in portions of layer 62 that are serving as black mask regions) or may be colored pigment (e.g., in portions of layer 62 that are serving as color filter elements). Examples of pigments that may be used in layer 62 include black pigment, red pigment, blue pigment, and/or green pigment. Pigments such as these may be incorporated into a layer such as layer 62 that is formed from a polymer such as and acrylic-based or polyimide-based photoresist. If desired, layer 62 may be formed using a combination of sublayers such as one or more sublayers with a fixed pigment concentration and one or more sublayers with a pigment concentration that varies continuously as a function of distanced through the thickness of the sublayer.

The foregoing is merely illustrative of the principles of this invention and various modifications can be made by those skilled in the art without departing from the scope and spirit of the invention.

What is claimed is:

1. A display, comprising:
   a thin-film transistor layer;
   a color filter substrate layer;
   a layer of liquid crystal material interposed between the thin-film transistor layer and the color filter substrate layer;

a first pigmented layer on the color filter substrate layer; and a second pigmented layer on the color filter substrate layer, wherein the first pigmented layer is interposed between the second pigmented layer and the color filter substrate layer, the first and second pigmented layers have different respective pigment concentrations, and the first and second pigmented layers comprise black mask layers with different respective first and second concentrations of black pigment.

2. The display defined in claim 1 wherein the first and second pigmented layers are patterned to form an opaque border region that covers a peripheral inactive area in the display.

3. The display defined in claim 2 wherein the black pigment in the first and second pigmented layers comprise carbon black.

4. The display defined in claim 1 further comprising an array of color filter elements on the color filter substrate, wherein the first and second pigmented layers are patterned to form a black matrix having openings in which the color filter elements are formed.

5. The display defined in claim 4 further comprising a layer of color filter element material that is interposed between the first and second pigmented layers in the black matrix.

6. The display defined in claim 5 wherein the first pigmented layer comprises black matrix lines of a first width and wherein the second pigmented layer comprises black matrix lines of a second width that is greater than the first width, wherein the black matrix lines of the first width overlap with the black matrix lines of the second width.

7. The display defined in claim 1 wherein the first and second pigmented layers further include at least one layer of color filter material.

8. The display defined in claim 1 wherein the first pigmented layer further comprises color filter material and wherein the second pigmented layer further comprises color filter material.

9. The display defined in claim 8 wherein the first and second pigmented layers are configured to form at least some color filter elements in an array of color filter elements in an active portion of the display.

10. The display defined in claim 9 wherein the first and second pigmented layers include pigment selected from the group consisting of: green pigment, blue pigment, and red pigment.

11. A display, comprising:
a thin-film transistor layer;
a color filter substrate layer;
a layer of liquid crystal material interposed between the thin-film transistor layer and the color filter substrate layer;
a first pigmented layer on the color filter substrate layer; and
a second pigmented layer on the color filter substrate layer, wherein the first pigmented layer is interposed between the second pigmented layer and the color filter substrate layer, the first and second pigmented layers have different respective pigment concentrations, the first pigmented layer comprises color filter material, and the second color filter material comprises black pigmented material.

12. The display defined in claim 11 wherein the first and second pigmented layers are patterned to form an opaque masking region surrounding a peripheral active display region in the display.

13. The display defined in claim 11 wherein the first and second pigmented layers are patterned to form at least one black matrix structure in a color filter array.

14. A display, comprising:
a plurality of display layers through which light passes that forms an image for a viewer; and
a black masking layer on a surface of one of the plurality of display layers, wherein the black masking layer comprises a first black masking sublayer having a first concentration of black pigment and a second black masking sublayer on the first black masking sublayer, wherein the second black masking sublayer has a second concentration of black pigment that is different than the first concentration of black pigment.

15. The display defined in claim 14 wherein the first and second black masking sublayers comprise photoresist and wherein the black pigment comprises carbon black.

16. The display defined in claim 15 wherein a portion of the black masking layer is patterned to form a black matrix, the display further comprising a color filter array with elements that are separated by portions of the black matrix.

17. The display defined in claim 16 wherein the color filter array comprises at least one color filter element formed from multiple layers of material having different respective colored pigment concentrations.

18. The display defined in claim 16 wherein the color filter array comprises at least one color filter element formed exclusively from a single layer of color filter material.

19. A liquid crystal display comprising:
a thin-film transistor layer having thin-film transistors on a thin-film substrate layer;
a color filter layer having a color filter substrate layer;
a layer of liquid crystal material between the thin-film transistor layer and the color filter layer, wherein the color filter layer comprises an opaque masking layer, the opaque masking layer comprises a first layer of photoresist with a first concentration of pigment and a second layer of photoresist that covers the first layer of photoresist and that has a second concentration of pigment that is different from the first concentration of pigment, and the first and second layers of photoresist comprise black mask layers.

20. The liquid crystal display defined in claim 19 wherein the opaque masking layer is interposed between the color filter layer substrate and the thin-film transistor substrate layer and wherein the first layer of photoresist has a thickness and pigment concentration configured to reduce light reflections from the opaque masking layer.

21. The liquid crystal display defined in claim 20 wherein the second layer of photoresist has a carbon black concentration of at least 70%.

* * * * *